(12) United States Patent
Hallamasek (10) Patent No.: US 9,458,829 B2
(45) Date of Patent: Oct. 4, 2016

(54) PLASTIC OPTICAL FIBER FOR RELIABLE LOW-COST AVIONIC NETWORKS

(71) Applicant: Google Inc., Mountain View, CA (US)

(72) Inventor: Kurt Hallamasek, San Carlos, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 14/320,565

(22) Filed: Jun. 30, 2014

(65) Prior Publication Data

US 2015/0375852 A1 Dec. 31, 2015

(51) Int. Cl.
| | |
|---|---|
| A63H 27/08 | (2006.01) |
| B64C 31/06 | (2006.01) |
| F41J 9/08 | (2006.01) |
| F03D 9/00 | (2016.01) |
| F03D 7/02 | (2006.01) |
| F03D 7/04 | (2006.01) |

(52) U.S. Cl.
CPC .......... *F03D 9/003* (2013.01); *F03D 7/02* (2013.01); *F03D 7/047* (2013.01); *F03D 13/20* (2016.05); *F05B 2240/921* (2013.01); *Y02E 10/723* (2013.01); *Y02E 10/728* (2013.01)

(58) Field of Classification Search
CPC ......... B64C 13/50; B64C 9/00; B64C 31/06; B64C 39/022
USPC ........................................... 244/154
See application file for complete search history.

(56) References Cited

U.S. PATENT DOCUMENTS

| | | | | |
|---|---|---|---|---|
| 4,692,610 A | * | 9/1987 | Szuchy | G01L 1/247 244/1 R |
| 5,806,805 A | * | 9/1998 | Elbert | B64C 13/42 244/195 |
| 5,823,468 A | * | 10/1998 | Bothe | B64B 1/08 244/12.3 |
| 8,346,032 B2 | | 1/2013 | Schilling et al. | |
| 8,511,606 B1 | | 8/2013 | Lutke et al. | |
| 2008/0048453 A1 | | 2/2008 | Amick | |
| 2008/0057776 A1 | | 3/2008 | Cummings | |
| 2011/0260462 A1 | | 10/2011 | Vander Lind | |
| 2012/0104763 A1 | * | 5/2012 | Lind | B64C 31/06 290/55 |
| 2012/0217757 A1 | | 8/2012 | Aoki | |
| 2012/0253556 A1 | * | 10/2012 | Noll | B64C 13/503 701/3 |
| 2013/0173939 A1 | | 7/2013 | Peto | |
| 2013/0221154 A1 | | 8/2013 | Vander Lind et al. | |
| 2014/0001308 A1 | | 1/2014 | Costa Duarte Pardal et al. | |

FOREIGN PATENT DOCUMENTS

| | | |
|---|---|---|
| EP | 2598400 | 6/2013 |
| WO | 2013052178 | 4/2013 |

OTHER PUBLICATIONS

Tomczyk (NPL—Experimental Fly-By-Wire Control System for General Aviation Aircraft).*
International Searching Authority, International Search Report and Written Opinion for PCT/US2015/034027 mailed Aug. 26, 2015, 12 pages.

* cited by examiner

*Primary Examiner* — Richard G Davis
(74) *Attorney, Agent, or Firm* — McDonnell Boehnen Hulbert & Berghoff LLP.

(57) ABSTRACT

An airborne wind turbine system including an aerial vehicle having a main wing, an electrically conductive tether having a first end secured to the aerial vehicle and a second end secured to a ground station, a plurality of power generating turbines connected to the main wing, a communication network positioned with the aerial vehicle, including a first flight control computer, and first plastic optical fiber signal transmission lines extending between the first flight control computer and the plurality of power generating turbines.

19 Claims, 8 Drawing Sheets

PLASTIC OPTICAL FIBER FOR RELIABLE LOW-COST AVIONIC NETWORKS

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine (AWT).

SUMMARY

In one aspect, an airborne wind turbine system is provided including an aerial vehicle having a main wing, a fuselage, a rudder, and a rear elevator, as well as a plurality of power generating turbines secured to the main wing and a plurality of ailerons positioned on the wing. The aerial vehicle includes first and second flight control computers that are linked to the plurality of power generating turbines, a plurality of aileron servo motors, a plurality of rudder servo motors, and a plurality of rear elevator servo motors using plastic optical fiber as the signal transmission medium. A dual redundant communication system is provided so that in the event one link fails, there is a backup link between the flight control computers and each component linked in the network. The redundant communication system and use of plastic optical fiber as the signal transmission medium provides for significant improvements in overall system reliability, ease of service and maintenance, as well as overall cost when compared to prior airborne communication systems.

In another aspect, an airborne wind turbine system is provided including an aerial vehicle having a main wing, an electrically conductive tether having a first end secured to the aerial vehicle and a second end secured to a ground station, a plurality of power generating turbines connected to the main wing, a communication network positioned with the aerial vehicle, including a first flight control computer, and first plastic optical fiber signal transmission lines extending between the first flight control computer and the plurality of power generating turbines.

In a further aspect, an airborne wind turbine system is provided including an aerial vehicle having a fuselage and a main wing, an electrically conductive tether having a first end secured to the aerial wing and a second end secured to a ground station, a plurality of power generating turbines connected to the main wing, first and second ailerons positioned on a first side of the main wing, third and fourth ailerons positioned on a second side of the main wing that is on an opposite side of the fuselage from the first side of the main wing, a communication network positioned with the aerial vehicle, including a first flight control computer and a second flight control computer, a first duplex plastic optical fiber signal transmission line extending between the first flight control computer and the first aileron, a second duplex plastic optical fiber signal transmission line extending between the first aileron and the second aileron, a third duplex plastic optical fiber signal transmission line extending between the first flight control computer and the second flight control computer, a fourth duplex plastic optical fiber signal transmission line extending between the second flight control computer and the second aileron, a fifth duplex plastic optical fiber signal transmission line extending between the first aileron and the second aileron, a sixth duplex plastic optical fiber signal transmission line extending between the second flight control computer and the third aileron, a seventh duplex plastic optical fiber signal transmission line extending between the third aileron and the fourth aileron, an eighth duplex plastic optical fiber signal transmission line extending between the second flight control computer and the second aileron, and a ninth duplex plastic optical fiber signal transmission line extending between the first aileron and the second aileron.

In another aspect, an airborne wind turbine is provided including an aerial vehicle having a main wing, an electrically conductive tether having a first end secured to the aerial vehicle and a second end secured to a ground station, a plurality of power generating turbines connected to the main wing, a flight control system positioned with the aerial vehicle, a communication network positioned with the aerial vehicle, wherein the flight control system comprises dual redundant first and second flight control computers, wherein the communication network comprises a dual redundant network, wherein the dual redundant first and second flight control computers are connected to the dual redundant communication network, and wherein the first and second flight computers are linked to the communication network and to each other using plastic optical fiber as a signal transmission medium.

In another aspect, a means for providing dual redundant flight control computers connected to a dual redundant network using plastic optical fiber on an aerial vehicle are disclosed. In a further aspect means for providing triple-redundant flight control computers connected to a dual redundant network using plastic optical fiber on an aerial vehicle are disclosed.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments relate to aerial vehicles, which may be used in a wind energy system, such as an Airborne Wind Turbine (AWT). In particular, illustrative embodiments may relate to or take the form of methods and systems using an airborne vehicle that is attached to a ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path above the ground (or water) to convert kinetic wind energy to electrical energy. In such cross wind flight, the aerial vehicle flies across the wind in a circular pattern similar to the tip of a wind turbine. The rotors attached to the rigid wing may be used to generate power by slowing the wing down. In particular, air moving across the turbine blades may force the blades to rotate, driving a generator to produce electricity. The aerial vehicle may also be connected to a ground station via an electrically conductive tether that transmits power generated by the aerial vehicle to the ground station, and on to the grid.

When it is desired to land the aerial vehicle, the electrically conductive tether is wound onto a spool or drum in the ground station and the aerial vehicle is reeled in towards a perch on the ground station. Prior to landing on the perch, the aerial vehicle transitions from a flying mode to a hover mode. The drum is further rotated to further wind the tether onto the drum until the aerial vehicle comes to rest on the perch.

The aerial vehicle may spend a significant period of time aloft as it generates electricity. However, during those periods the aerial vehicle is susceptible to lightning strikes, and other forms of electromagnetic interference ("EMI"). Therefore, it is desirable to provide electrical isolation of the onboard communication network of the aerial vehicle, from both the high-voltage motor/turbine system and EMI, from motors and lightning.

One alternative to using an electrically conductive medium such as a copper wire in a communication network is to use optical fiber, which may be used for long high-bandwidth links, e.g. to connect cities or buildings on a campus. This type of fiber is made of glass, with typical core diameters of 9, 50 and 62.5 microns. The glass optical fiber technology requires connectors with good mechanical precision and good quality optical finish of the glass surfaces that interface to couplers, sensors and transducers.

To provide for the desired electrical isolation and reduced susceptibility to EMI from lightning or other sources, glass optical fiber is typically used in airborne commercial and military applications. However, installing and servicing glass fiber links also requires a level of cleanliness that is generally attainable only in specialized settings. Additionally, when glass fiber technology is used in airborne commercial or military applications, the fiber optic connector technology required to support the operational environment that is characterized by vibration, humidity and debris is very expensive as such connectors may cost on the order of $400-$1000 each.

Given that there could be 20 or more optical links on an AWT, the cost of supporting multimode glass fiber onboard becomes prohibitively expensive. Moreover, given the small diameters of the glass optical fibers, even a small speck of dust at the point of connection can cause the optical fibers to fail as a signal transmitter. Therefore, using existing glass optical fiber technology for the communication system of an AWT is very expensive given the difficulty of servicing and maintaining the aerial vehicle in the field where the aerial vehicle is subject to harsh operating conditions characterized by vibration, humidity, wind, and debris.

Therefore, it would be desirable to provide an onboard communication system that could provide for the desired electrical isolation, yet also be serviceable in the field where the signal transmission medium could be more easily cut, terminated, and connected, and still operate reliably even under the harsh operating conditions where dirt and debris are involved.

In an example embodiment, Plastic Optical Fiber (POF), sometimes also referred to as polymer optical fiber, is used to transmit signals onboard the aerial vehicle, instead of electrical conductors or glass optical fiber. POF as a communication link medium on the aerial wing network provides galvanic isolation between the high-voltage motor/turbine system and the flight computer. Plastic optical fiber also reduces the susceptibility to electromagnetic interference, from motors and lightning. POF may be made of a super pure polymethylmethacrylate (PMMA) fiber core, which may be clad with a fluoropolymer jacket. Importantly, POF may have a large core diameter of about 1 mm. In comparison, a multi-mode glass fiber has a core diameter of 62.5 microns. The comparatively large diameter core of the POF allows for easier coupling to receiver and transmitter electronics and allows the use of low-cost connector systems that are suitable for use in industrial environments.

The main drawbacks of using POF over glass fiber are increased energy absorption and increased modal dispersion. Basic POF fiber attenuation, or optical loss, is typically specified in the range of 160 dB/km to 300 dB/km when used with a 650 nm LED transmitter. In comparison, the loss in multi-mode glass fiber is typically specified at only about 0.3 dB/km to 10 dB/km. The high attenuation limits the length of a POF link to typically 50 meters or less. In addition, standard low-cost POF fibers have a step-index, rather than a gradient index, which increases pulse dispersion. The increased core diameter allows the fiber to gather more light from the LED transmitter, but the increased numerical aperture also increases the pulse dispersion. The pulse dispersion limits the signaling bandwidth to Fast Ethernet speeds. Because of these drawbacks and longstanding use of multi-mode glass optical fiber, multi-mode glass optical fiber is widely used in commercial or military airborne applications.

However, a typical aerial vehicle used in an AWT is much smaller than conventional commercial and military aircraft. Therefore, despite the drawback of a high degree of attenuation or optical loss when using POF, because the distances between optical connections is relatively short, the use of POF is suitable for signal transmission within an AWT aerial vehicle. In particular, the distance between the centrally located flight controller units, or flight computers, to the furthest aileron may be less than 10 meters, and the distances between respective ailerons may be on the order of 3.5 meters. Moreover, the distance between Flight Controller Units (FCU) and the turbine/motors may also be on the order of 6 meters or less, and the distance between the FCUs and the rudders and rear wings (or elevators) may also be less than 10 meters in length. Therefore, the use of POF is suitable for these limited distances on the aerial vehicle of the AWT.

Not only is POF suitable for signal transmission for the limited distances required on the aerial vehicle, but the use of POF provides significant advantages over electrical conductors or multi-mode glass optical fibers. In particular, POF is lighter than copper, and is reliable, serviceable, and provides the desired electrical isolation.

As noted above, the core of POF may have a diameter of around 1 mm, whereas the core of multi-mode glass optical fiber has a diameter of 62.5 microns. As a result, the area of connection of the POF core is over 250 times greater than the area of connection of the glass fiber core. As a result, the POF core is relatively immune to micron-sized dirt and debris. For example, a piece of debris at a connection point that would render communications between glass fibers unreliable may have no effect on the connection point between the POF fiber given its much larger surface area of connection. In order to get the same immunity to debris and scratches that POF fiber affords, costly expanded beam connectors are required where cleaning of connectors is not an option, which increase costs significantly compared to typical POF connectors.

In addition, because of the comparatively much larger surface area at the connection points when using POF, the POF is much easier to cut/mate, easier to align with allowance for a degree of misalignment that could not be tolerated when using glass fiber, and much more tolerant of a harsh environment if dirt and debris are present. Therefore, the use of POF for signal transmission advantageously provides increased reliability for the communication system.

The communication network positioned on the aerial vehicle may also include a number of redundancies to advantageously insure reliable operation. In particular, there may be two flight control computers used. Duplex POF transmission lines for transmitting and receiving signals may extend between each flight control computer and each of the power generating turbines. The duplex POF transmission line may be constructed of two simplex fibers, which may be joined with a zipcord web. For further redundancy a third flight control computer may also be used.

Similarly, duplex POF transmission lines may also extend between each flight control computer and each of the ailerons, rudders, and rear elevators. If one link fails, there is a redundant line that may be used from the other flight controller. Thus, the system has an increased level of reliability based on the built in redundancies and use of the POF transmission lines.

2. Illustrative Airborne Wind Turbines

Figure 1:
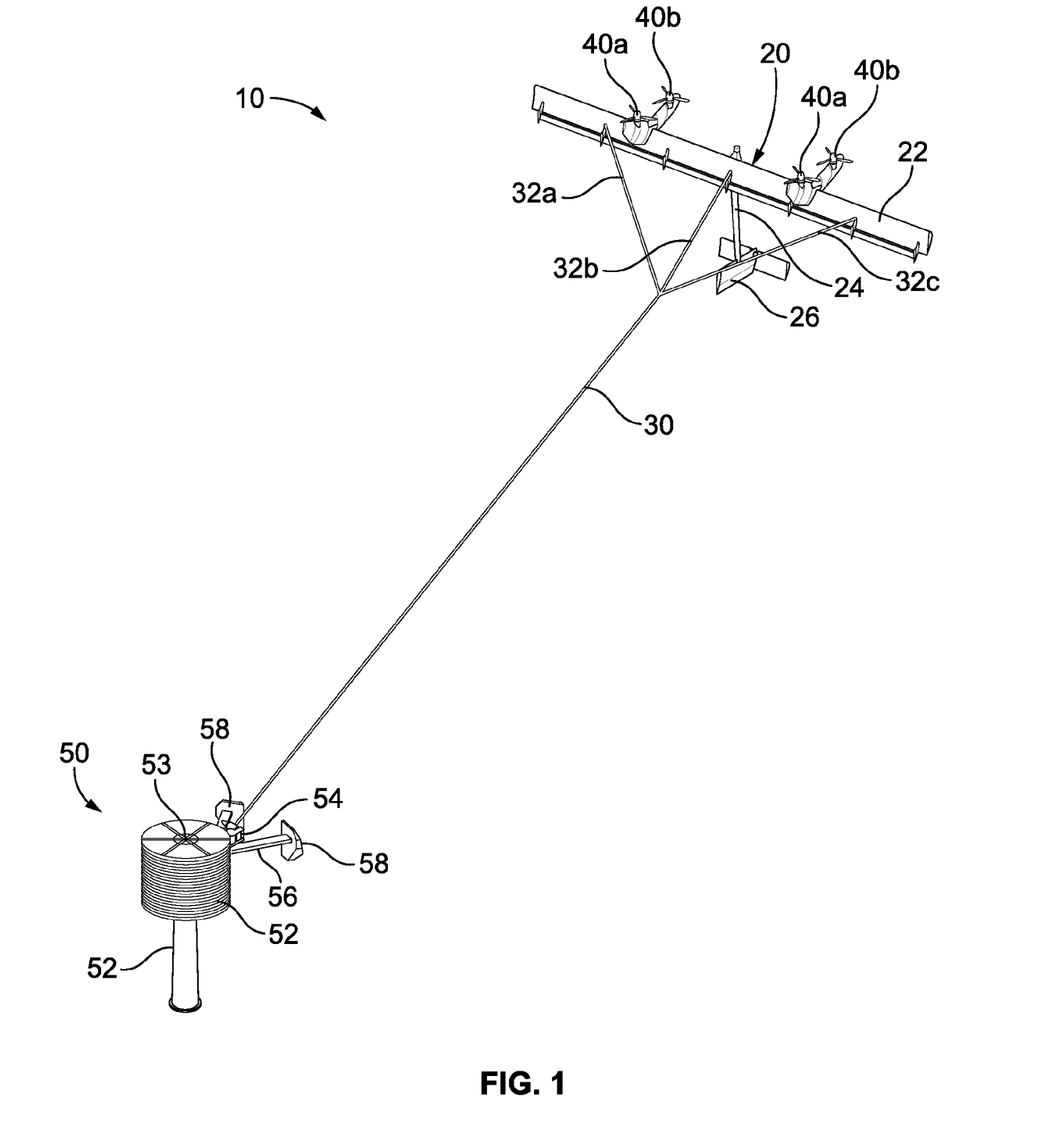
FIG. 1 is a perspective view of an airborne wind turbine 10 including aerial vehicle 20 attached to a ground station 50 with an electrically conductive tether 30, according to an example embodiment.
Figure 2:
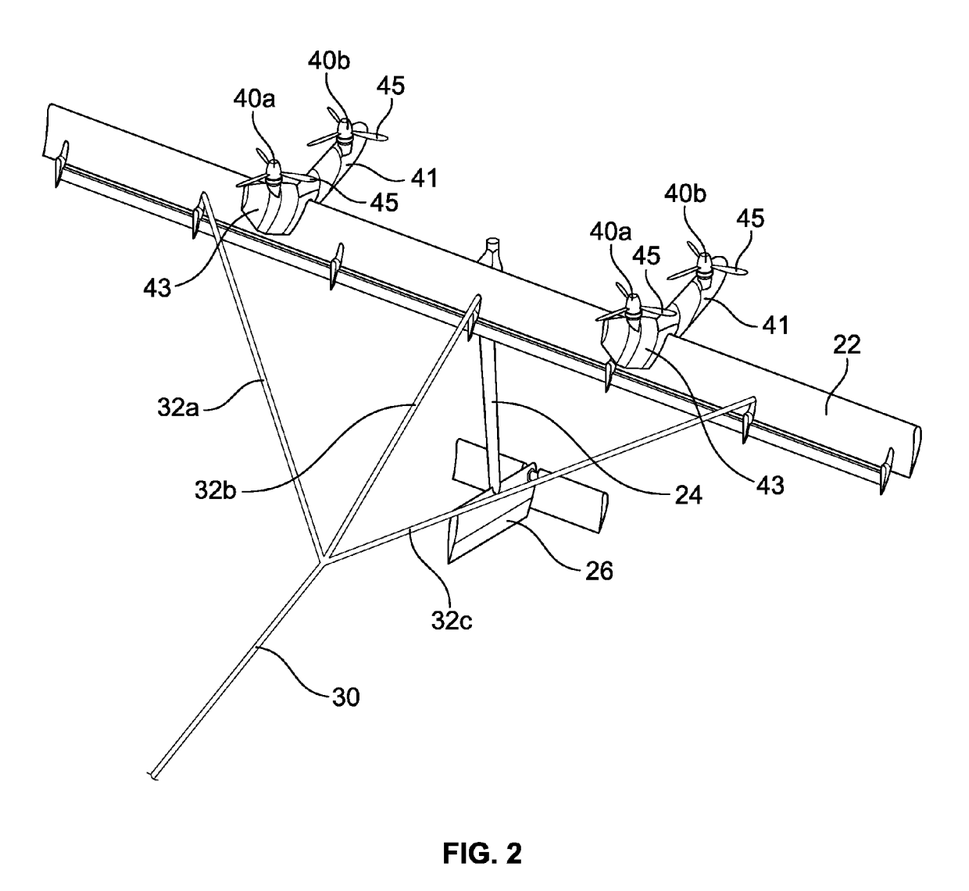
FIG. 2 is a close-up perspective view of aerial vehicle 20 shown in FIG. 1.

As disclosed in FIGS. 1-2, an airborne wind turbine (AWT) 10 is disclosed, according to an example embodiment. AWT 10 is a wind based energy generation device that includes an aerial vehicle 20 constructed of a rigid wing 22 with mounted turbines 40 that flies in a path, such as a substantially circular path, across the wind. In an example embodiment, the aerial vehicle may fly between 250 and 600 meters above the ground (or water) to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40 attached to the rigid wing 22 are used to generate power by slowing the wing 22 down. Air moving across the turbine blades forces them to rotate, driving a generator to produce electricity. The aerial vehicle 20 is connected to a ground station 50 via an electrically conductive tether 30 that transmits power generated by the aerial vehicle to the ground station 50, and on to the grid.

As shown in FIG. 1, the aerial vehicle 20 may be connected to the tether 30, and the tether 30 may be connected to the ground station 50. In this example, the tether 30 may be attached to the ground station 50 at one location on the ground station 50, and attached to the aerial vehicle 20 at three locations on the aerial vehicle 2 using bridal 32a, 32b, and 32c. However, in other examples, the tether 30 may be attached at multiple locations to any part of the ground station 50 and/or the aerial vehicle 20.

The ground station 50 may be used to hold and/or support the aerial vehicle 20 until it is in an operational mode. The ground station may include a tower 52 that may be on the order of 15 meters tall. The ground station may also include a drum 52 rotatable about drum axis 53 that is used to reel in aerial vehicle 20 by winding the tether 30 onto the rotatable drum 52. In this example, the drum 52 is oriented vertically, although the drum may also be oriented horizontally (or at an angle). Further, the ground station 50 may be further configured to receive the aerial vehicle 20 during a landing. For example, support members 56 are attached to perch panels 58 that extend from the ground station 50. When the tether 30 is wound onto drum 52 and the aerial vehicle 20 is reeled in towards the ground station 50, the aerial vehicle may come to rest upon perch panels 58. The ground station 50 may be formed of any material that can suitably keep the aerial vehicle 20 attached and/or anchored to the ground while in hover flight, forward flight, or crosswind flight. In some implementations, ground station 50 may be configured for use on land. However, ground station 50 may also be implemented on a body of water, such as a lake, river, sea, or ocean. For example, a ground station could include or be arranged on a floating off-shore platform or a boat, among other possibilities. Further, ground station 50 may be configured to remain stationary or to move relative to the ground or the surface of a body of water.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 20 may be formed of solid structures of metal, plastic and/or other polymers. The aerial vehicle 20 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40a to the main wing 22, and rotor connectors 41 may be used to connect the lower rotors 40b to the main wing 22. In some examples, the rotor connectors 43 and 41 may take the form of or be similar in form to one or more pylons. In this example, the rotor connectors 43 and 41 are arranged such that the upper rotors 40a are positioned above the wing 22 and the lower rotors 40b are positioned below the wing 22.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and which could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 52 is rotated to reel in the aerial vehicle 20 towards the perch panels 58 on the ground station 50, and the electrically conductive tether 30 is wound onto drum 52. Prior to landing on the perch panels 58, the aerial vehicle 20 transitions from a flying mode to a hover mode. The drum 52 is further rotated to further wind the tether 30 onto the drum 52 until the aerial vehicle 20 comes to rest on the perch panels 58.

Figure 3:
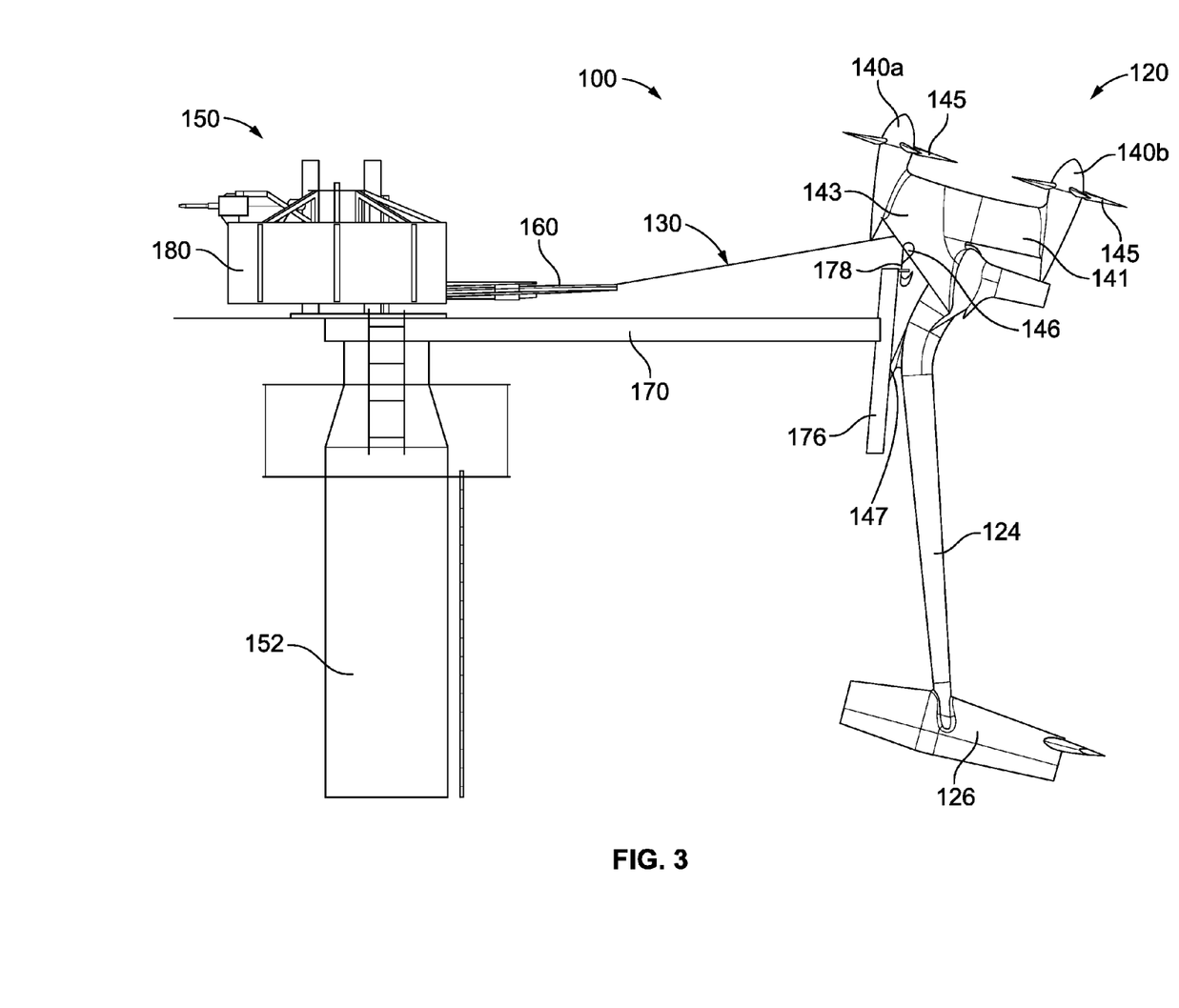
FIG. 3 is a side view of aerial vehicle 120 perched on perch panel 160 attached to ground station 150, according to an example embodiment.
Figure 4:
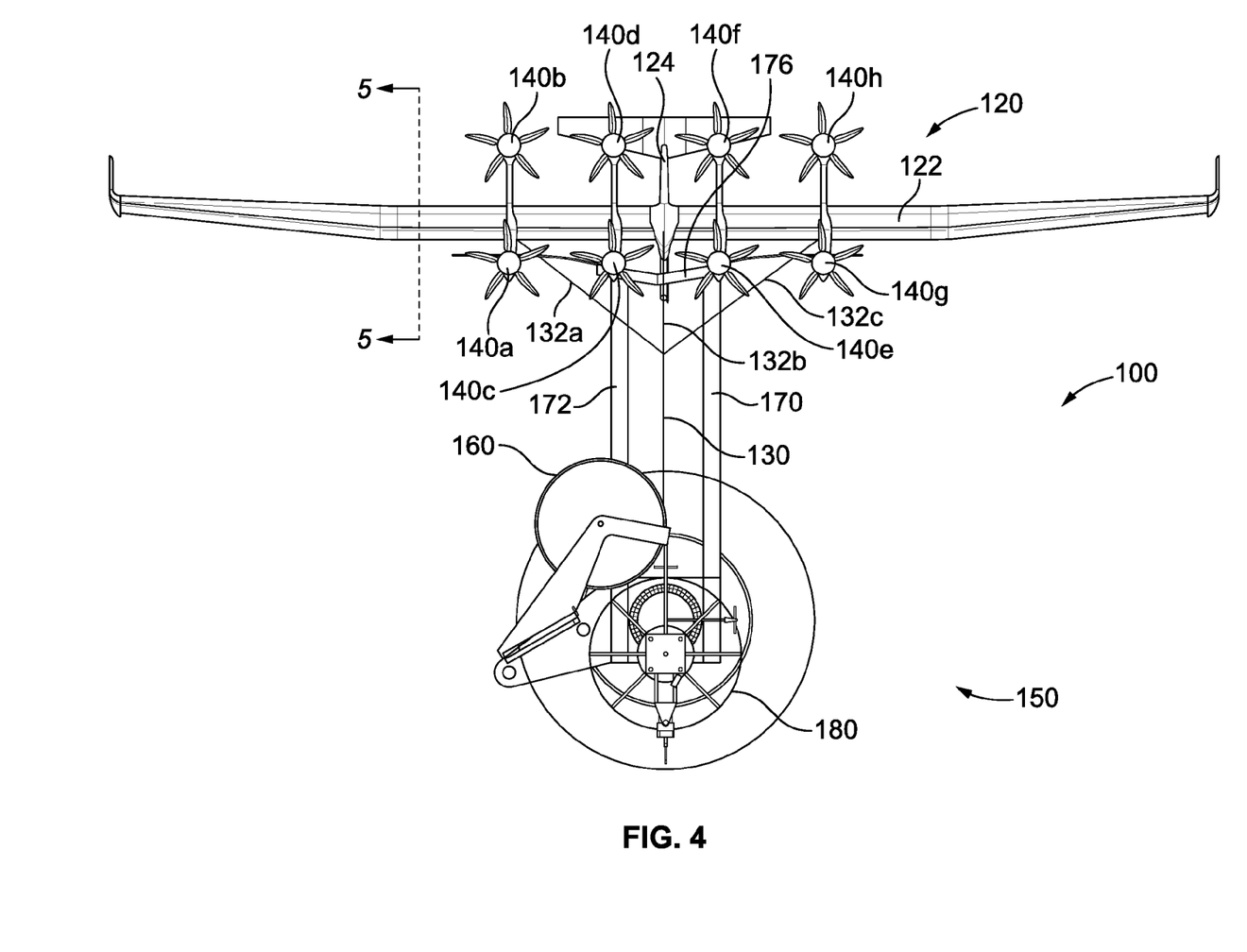
FIG. 4 is a top view of the aerial vehicle 120 and ground station 150 shown in FIG. 3, according to an example embodiment.

FIG. 3 is a side view of an airborne wind turbine including aerial vehicle 120 perched on perch panel 160 attached to ground station 150, and FIG. 4 is a top view of the aerial vehicle 120 and ground station 150 shown in FIG. 3, according to an example embodiment. In FIGS. 3 and 4, ground station 150 includes a tower 152 upon which rotatable drum 180 and levelwind 182 are positioned. In an embodiment, the tower 152 may be 15 meters in height. An electrically conductive tether 130 extends from the levelwind and is attached to wing 122 of aerial vehicle 120 using bridle lines 132a, 132b, and 132c. In one embodiment the bridle lines 132a, 132b, and 132c may be attached at asymmetric locations along the span of the wing 122, such that the inboard side of wing 122 has the bridle attached further from the wingtip, and the outboard side of the wing 122 has the bridle attached closer to the outboard wingtip. Such an asymmetric configuration allows the bridle lines 132a and 132c to better clear a larger sized perch panel.

The perch panel 160 is supported by perch panel support members 170a and 170b that extend horizontally from a perch platform 172 positioned on the ground station 150. The perch panel platform 172 may rotate about the top of the tower 52 so that the perch panel 160 is in proper position when the aerial vehicle is 120 is landing. Aerial vehicle 120 includes lower rotors 140a mounted on pylons 143 attached to wing 122 and upper rotors 140b mounted on pylons 143 attached to wing having propellers 145. Rotors 140a and 140b may serve power generating turbines. In an embodiment, wing 122 is 4 meters long. Aerial vehicle includes a fuselage 124 having a curved section 129 to which a peg 28 is attached. In a perched condition, as shown in FIGS. 3 and 4, peg 28 contacts perch panel 160 constructed of a first side 160a and a second side 160b.

Furthermore, when the aerial vehicle 120 is in hover mode during landing, the peg 128 extends downwardly and outwardly from the fuselage 124 towards the perch panel 160. As shown in FIG. 4, the perch panel 160 may be aligned with the tether 130 being guided through levelwind 182 and onto a rotatable drum 180 that rotates about an axis 184 on ground station 150. In this manner, the perch panel 160 faces the fuselage 124 of the aerial vehicle 120 when it is landing. The drum 180 shown in FIGS. 3 and 4 has a vertical axis of rotation 184. However a horizontal drum or an angled drum could also be used. For example, if a drum rotatable about a horizontal axis is used, the perch platform 172 could be coupled to the drum such that the perch platform 172 extends perpendicularly from the axis of the drum and the tether 130 is wound onto the drum over the perch panel 160. In this manner as the tether 130 is wound onto the drum, the perch panel 130 will always face the aerial vehicle 120 and be in position to receive the peg 128 on the fuselage 124 of the aerial vehicle 120. In fact, the drum could be positioned on the perch platform 172 such that the tether 130 (or center tether bridle 132b) extends over the bottom of the groove 164 of the perch panel 160.

3. POF Communication System with Built-In Redundancies

Figure 5:
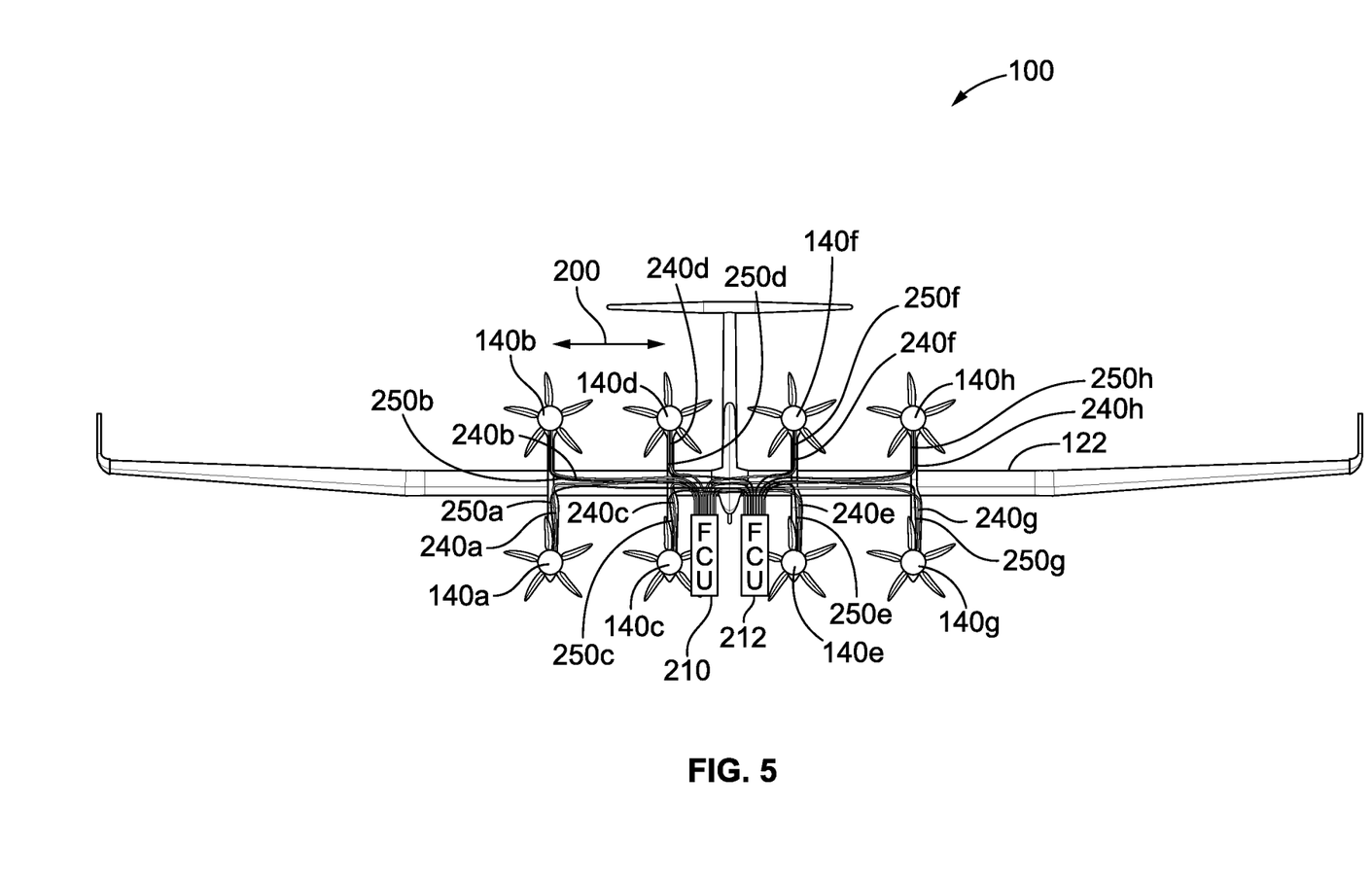
FIG. 5 is a wiring diagram for aerial vehicle 120 shown in FIGS. 3 and 4, showing the wiring of flight control units 210 and 212 to power generating turbines 140*a-g*, according to an example embodiment.

FIG. 5 is a wiring diagram for aerial vehicle 120 shown in FIGS. 3 and 4, showing the wiring of flight control units 210 and 212 to rotors 140a-140h. In particular, duplex plastic optical fiber is used as the signal transmission medium between the flight control units 210 and 212 and power generating turbines 140a-140h. Duplex plastic optical fiber allows two-way communication between the components, by providing one line for transmitting a signal and one line for receiving a signal. In addition, as described below a redundancy is advantageously incorporated into the system to provide for increased reliability for the communication network on the airborne wind turbine 100.

As shown in FIG. 5, aerial vehicle 120 includes a main wing 122 to which rotors 140a-140g are attached. Rotors 140a-140h may serve as thrust generators, e.g., during takeoff from the perch, and also may serve as power generating turbines when the aerial vehicle is operating in a normal flying mode. To provide a high degree of system reliability, a first flight control unit 210 provides a communication link to each of the rotors 140a-140h using a duplex plastic optical fiber.

In particular, duplex plastic optical fiber 240a extends between first flight control unit 210 and rotor 140a, duplex plastic optical fiber 240b extends between first flight control unit 210 and rotor 140b, duplex plastic optical fiber 240c extends between first flight control unit 210 and rotor 140c, duplex plastic optical fiber 240d extends between first flight control unit 210 and rotor 140d, duplex plastic optical fiber 240e extends between first flight control unit 210 and rotor 140e, duplex plastic optical fiber 240f extends between first flight control unit 210 and rotor 140f, duplex plastic optical fiber 240g extends between first flight control unit 210 and rotor 140g, and duplex plastic optical fiber 240h extends between first flight control unit 210 and rotor 140h.

Reliable signal transmission also entails the use of a redundant second flight control unit 212. To provide the high degree of system reliability, the second flight control unit 212 also provides a communication link to each of the rotors 140a-140h using a duplex plastic optical fiber for signal transmission.

In particular, duplex plastic optical fiber 250a extends between first flight control unit 210 and rotor 140a, duplex plastic optical fiber 250b extends between first flight control unit 210 and rotor 140b, duplex plastic optical fiber 250c extends between first flight control unit 210 and rotor 140c, duplex plastic optical fiber 250d extends between first flight control unit 210 and rotor 140d, duplex plastic optical fiber 250e extends between first flight control unit 210 and rotor 140e, duplex plastic optical fiber 250f extends between first flight control unit 210 and rotor 140f, duplex plastic optical fiber 250g extends between first flight control unit 210 and rotor 140g, and duplex plastic optical fiber 250h extends between first flight control unit 210 and rotor 140h.

Using two flight control units, each linked to each of the rotors provides for reliable backup in the event one communication link fails. Furthermore, as noted above, because of the close proximity of the first and second flight control units 210 and 212 to each of the rotors 140a-140h, plastic optical fiber may be used as the signal transmission medium. In fact, the distance between Flight Controller Units (FCU) 210 and 212 and the rotors 140a-140h is on the order of 6 meters or less. Plastic optical fiber provides for more reliable connections than glass optical fiber because of the much larger surface area of plastic optical fiber at the point of connection. The comparatively large diameter core of the POF allows for easier coupling to receiver and transmitter electronics and allows the use of low-cost connector systems that are suitable for use in industrial environments.

In addition, because of the comparatively much larger surface area at the connection points when using POF, the POF is much easier to cut/mate, easier to align with allowance for a degree of misalignment that could not be tolerated when using glass fiber, and much more tolerant of a harsh environment if dirt and debris are present. Therefore, the use of plastic optical fiber for signal transmission advantageously provides increased reliability for the communication system. Not only is it more reliable than if glass optical fibers were used, but also less costly because expensive, precise connectors are not required as is the case with glass optical fibers when used in these harsh operating conditions in the presence of dust and debris.

Figure 6:
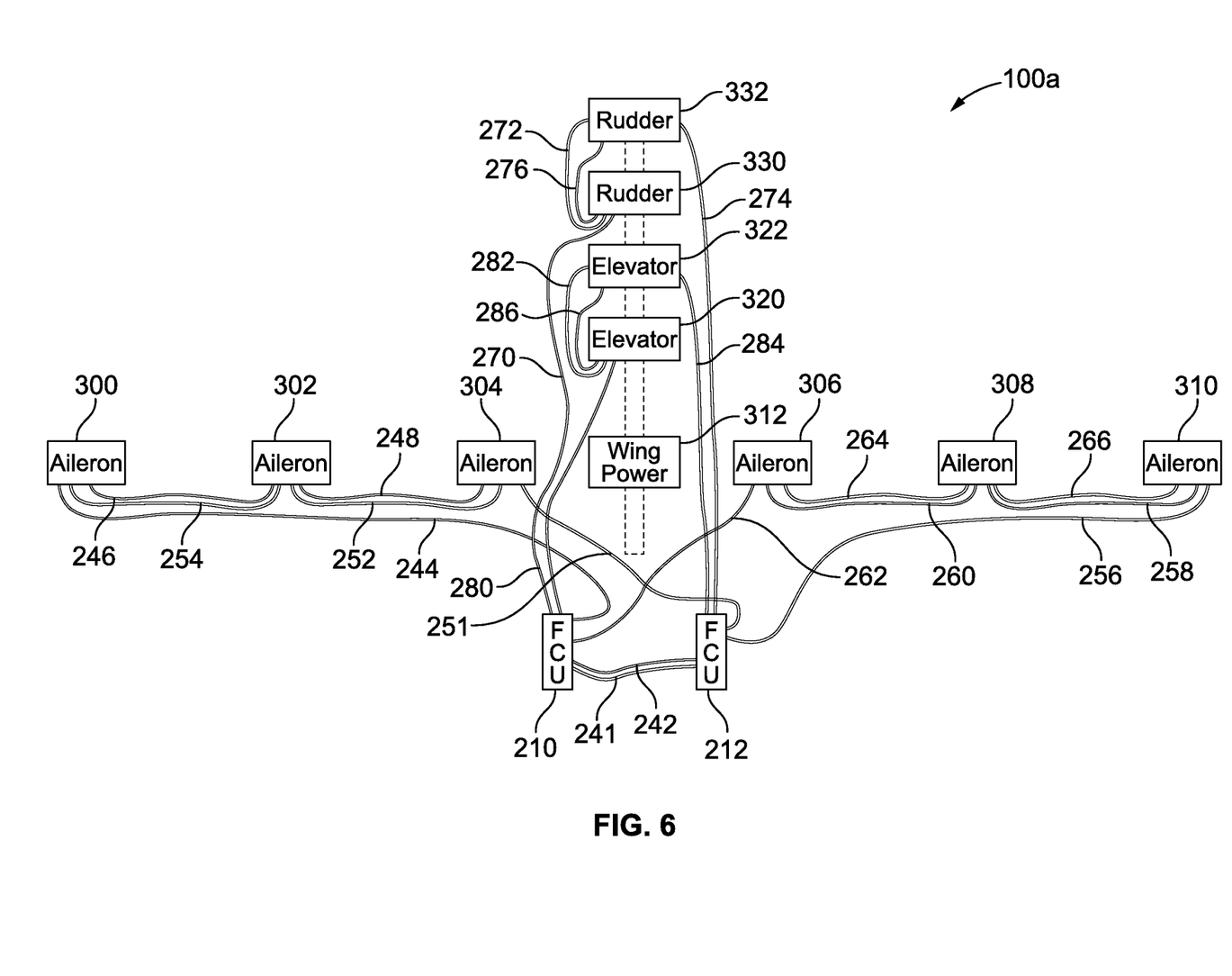
FIG. 6 is a wiring diagram for aerial vehicle 120 shown in FIGS. 3 and 4, showing the wiring of flight control units 210 and 212 with aileron, rear elevator, and rudder servo motors, according to an example embodiment.

The reliable communication system between the flight control units 210 and 212 and the rotors 140a-140h is also used for other signal transmission links within the airborne wind turbine 100. FIG. 6 is a wiring diagram 100a for aerial vehicle 120 shown in FIGS. 3 and 4, showing the wiring of flight control units 210 and 212 with aileron servo motors 300, 302, 304, 306, 308, and 310, rear elevator servo motors 320 and 322, and rudder servo motors 330 and 332.

As shown in FIG. 6, duplex plastic optical fiber is used to connect first flight control unit 210 with each of the aileron servo motors 300, 302, 304, 306, 308, and 310, and duplex plastic optical fiber is also used to connect second flight control unit 212 with each of the aileron servo motors 300, 302, 304, 306, 308, and 310. In particular, duplex plastic optical fiber 244 extends between first flight control unit 210 and aileron servo motor 300. Aileron servo motor 300 is linked to aileron servo motor 302 with duplex plastic optical fiber 246 and also redundantly connected with duplex plastic optical fiber 254, and aileron servo motor 302 is linked to aileron servo motor 304 with duplex plastic optical fiber 248, and redundantly connected with duplex plastic optical fiber 252.

Similarly, duplex plastic optical fiber 262 extends between first control unit 210 and aileron servo motor 306. Aileron servo motor 306 is linked to aileron servo motor 308 with duplex plastic optical fiber 264 and redundantly connected with duplex plastic optical fiber 260, and aileron servo motor 308 is linked to aileron servo motor 310 with duplex plastic optical fiber 266 and redundantly connected with duplex plastic optical fiber 258.

In this manner, first flight control unit 210 is in communication through duplex plastic optical fiber with each of the aileron servo motors 300, 302, 304, 306, 308, and 310, although it is not directly connected to each. Rather, first flight control unit 210 is directly connected to aileron servo motors 300 and 306, and indirectly connected to servo motors 302, 304, 308, and 310. This arrangement eliminates the need for a direct connection to each servo motor, while still providing a communication link between first flight control unit 210 and each of the aileron servo motors 300, 302, 304, 306, 308, and 310.

As also shown in FIG. 6, duplex plastic optical fiber is used to connect second flight control unit 212 with each of the aileron servo motors 300, 302, 304, 306, 308, and 310. In particular, duplex plastic optical fiber 256 extends between first flight control unit 212 and aileron servo motor 310. Aileron servo motor 310 is linked to aileron servo motor 308 with duplex optical fiber 266 and redundantly connected with duplex plastic optical fiber 256, and aileron servo motor 308 is linked to aileron servo motor 306 with duplex optical fiber 264 and redundantly linked with duplex plastic optical fiber 260.

Similarly, duplex plastic optical fiber 262 extends between second control unit 212 and aileron servo motor 304. Aileron servo motor 304 is linked to aileron servo motor 302 with duplex optical fiber 248 and redundantly connected with duplex plastic optical fiber 252, and aileron servo motor 302 is linked to aileron servo motor 3010 with duplex plastic optical fiber 254 and redundantly connected with duplex optical fiber 246.

In this manner, second flight control unit 212 is in communication through duplex plastic optical fiber with each of the aileron servo motors 300, 302, 304, 306, 308, and 310, although it is not directly connected to each. Rather, second flight control unit 212 is directly connected to aileron servo motors 304 and 310, and indirectly connected to servo motors 300, 302, 306, and 308. This arrangement eliminates the need for a direct connection to each servo motor, while still providing a communication link between second flight control unit 210 and each of the aileron servo motors 300, 302, 304, 306, 308, and 310. Additionally, this overall network topology advantageously employs shorter optical fiber lengths than other connection schemes, allowing each POF length to be within the optimal operating length for POF.

Furthermore, first flight control unit 210 and second flight control unit 212 are linked together with duplex plastic optical fiber 241 and redundantly connected with duplex plastic optical fiber 242. In this manner, if a communication link between the first flight control unit 210 with one of the aileron servo motors fails, the first flight control unit 210 is still linked to each of the ailerons through it connection to second flight control unit 212. Accordingly, first flight control unit 210 is linked to second flight control unit 212 which serves as a backup providing a second communication link to each of the ailerons 300, 302, 304, 306, 308, and 310.

Furthermore, the rear elevator servo motors 320 and 322 are also linked to the first flight control unit 210 and the second flight control unit 212 using duplex plastic optical fiber. In particular, duplex plastic optical fiber 280 is used as a communication link between first flight control unit 210 and first rear elevator servo motor 320. Rear elevator servo motor 320 is linked to rear elevator servo motor 322 with duplex plastic optical fiber 282 and redundantly connected with duplex plastic optical fiber 286. Duplex plastic optical fiber 284 is used as a communication link between second flight control unit 212 and second rear elevator servo motor 322. Of course, rear elevator servo motor 320 is linked to rear elevator servo motor 322 with duplex plastic optical fiber 282 and redundantly connected with duplex plastic optical fiber 286.

In this manner, first flight control unit 210 is in communication through duplex plastic optical fiber with both rear elevator servo motors 320 and 322, although it is not directly connected to each. Rather, first flight control unit 210 is directly connected to rear elevator servo motor 320 and indirectly connected to rear elevator servo motor 322. Similarly, second flight control unit 212 is in communication through duplex plastic optical fiber with both rear elevator servo motors 320 and 322, although it is not directly connected to each. Rather, second flight control unit 212 is directly connected to rear elevator servo motor 322 and indirectly connected to rear elevator servo motor 320.

This arrangement eliminates the need for a direct connection between each flight control unit 210 or 212 to both rear elevator servo motors 320 and 322, while still providing a communication link between first flight control unit 210 to each of the rear elevator servo motors 320 and 322, and also between second flight control unit 212 and each of the rear elevator servo motors 320 and 322.

Furthermore, first flight control unit 210 and second flight control unit 212 are linked together with duplex plastic optical fiber 241 and redundantly connected with duplex plastic optical fiber 242. In this manner, if a communication link between the first flight control unit 210 with one of the rear elevator servo motors fails, the first flight control unit 210 is still linked to each of the rear elevator servo motors through its connection to second flight control unit 212. Accordingly, first flight control unit 210 is linked to second flight control unit 212 which serves as a backup providing a second communication link to each of the rear elevator servo motors 320 and 322.

In addition, the rudder servo motors 330 and 332 are also linked to the first flight control unit 210 and the second flight control unit 212 using duplex plastic optical fiber. In particular, duplex plastic optical fiber 270 is used as a communication link between first flight control unit 210 and first rudder servo motor 330. First rudder servo motor 330 is linked to second rudder servo motor 332 with duplex plastic optical fiber 272 and redundantly connected with duplex plastic optical fiber 276. Duplex plastic optical fiber 274 is used as a communication link between second flight control unit 212 and second rudder servo motor 332. Of course, first rudder servo motor 330 is linked to second rudder servo motor 332 with duplex plastic optical fiber 272 and redundantly connected with duplex plastic optical fiber 276.

In this manner, first flight control unit 210 is in communication through duplex plastic optical fiber with both rudder servo motors 330 and 332, although it is not directly connected to each. Rather, first flight control unit 210 is directly connected to first rudder servo motor 330 and indirectly connected to rear elevator servo motor 332. Similarly, second flight control unit 212 is in communication through duplex plastic optical fiber with both rudder servo motors 330 and 332, although it is not directly connected to each. Rather, second flight control unit 212 is directly connected to second rudder servo motor 332 and indirectly connected to first rudder servo motor 330.

This arrangement eliminates the need for a direct connection between each flight control unit 210 or 212 to both rudder servo motors 330 and 332, while still providing a communication link between first flight control unit 210 to each of the rudder servo motors 330 and 332, and also between second flight control unit 212 and each of the rudder servo motors 330 and 332.

Furthermore, as noted above, first flight control unit 210 and second flight control unit 212 are linked together with duplex plastic optical fiber 241 and redundantly connected with duplex plastic optical fiber 242. In this manner, if a communication link between the first flight control unit 210 with one of the rudder servo motors fails, the first flight control unit 210 is still linked to each of the rear elevator servo motors through its connection to second flight control unit 212. Accordingly, first flight control unit 210 is linked to second flight control unit 212 which serves as a backup providing a second communication link to each of the rudder servo motors 330 and 332.

Figure 7:
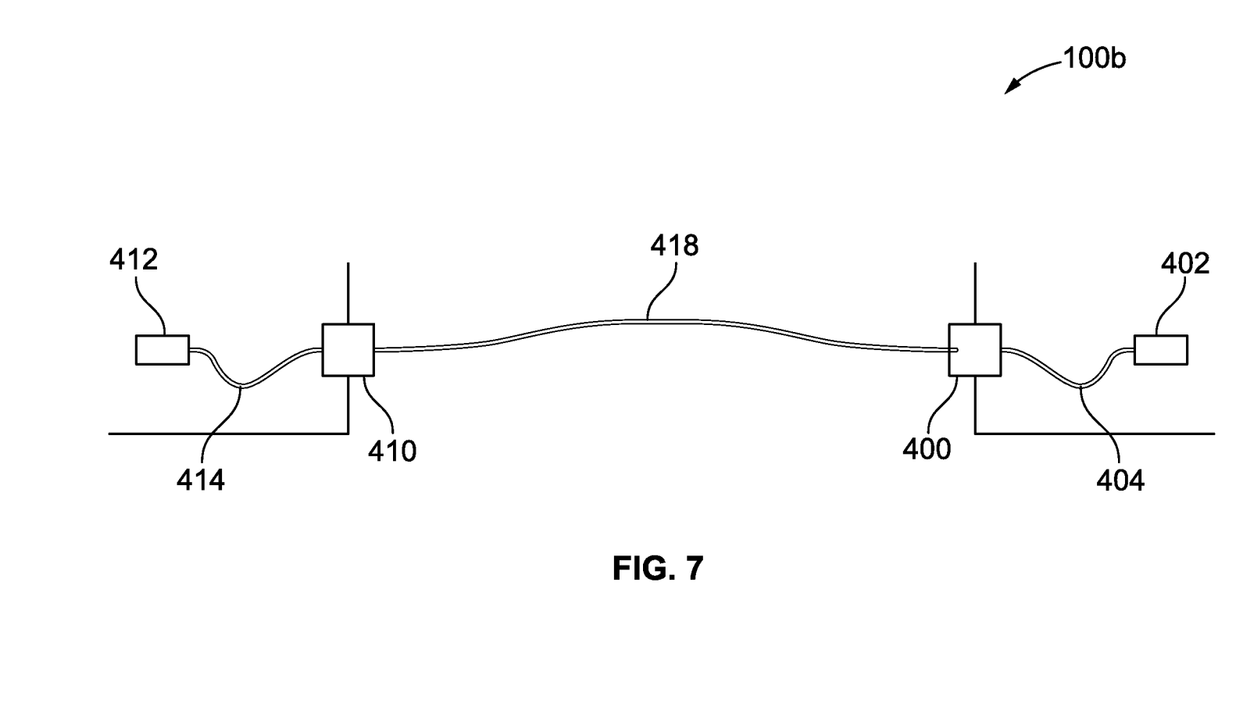
FIG. 7 is a schematic representation showing communication links that may be used in aerial vehicle 120 shown in FIGS. 3 and 4, according to an example embodiment.

FIG. 7 is a schematic representation 100b showing communication links that may be used in aerial vehicle 120 shown in FIGS. 3 and 4. For example, a PHY transceiver 402 may be positioned within a flight control enclosure having a bulkhead connector 400. A duplex plastic optical fiber pigtail 404 may extend between PHY transceiver 402 and bulkhead connector 400. Similarly, a PHY transceiver 412 may be positioned within an aileron node enclosure having a bulkhead connector 410. A duplex plastic optical fiber pigtail 414 may extend between PHY transceiver 412 and bulkhead connector 410. A duplex plastic optical fiber 418 extends between bulkhead connector 400 and 410. In this manner, duplex plastic optical fiber may be used to provide a communication link between PHY transceiver 402 in the flight computer enclosure and the PHY transceiver 412 in the aileron node enclosure. Duplex plastic optical fiber may be used in a similar manner to provide a communication link between the PHY transceiver 402 in the flight computer enclosure and the rear elevator and also to the rudder.

Figure 8:
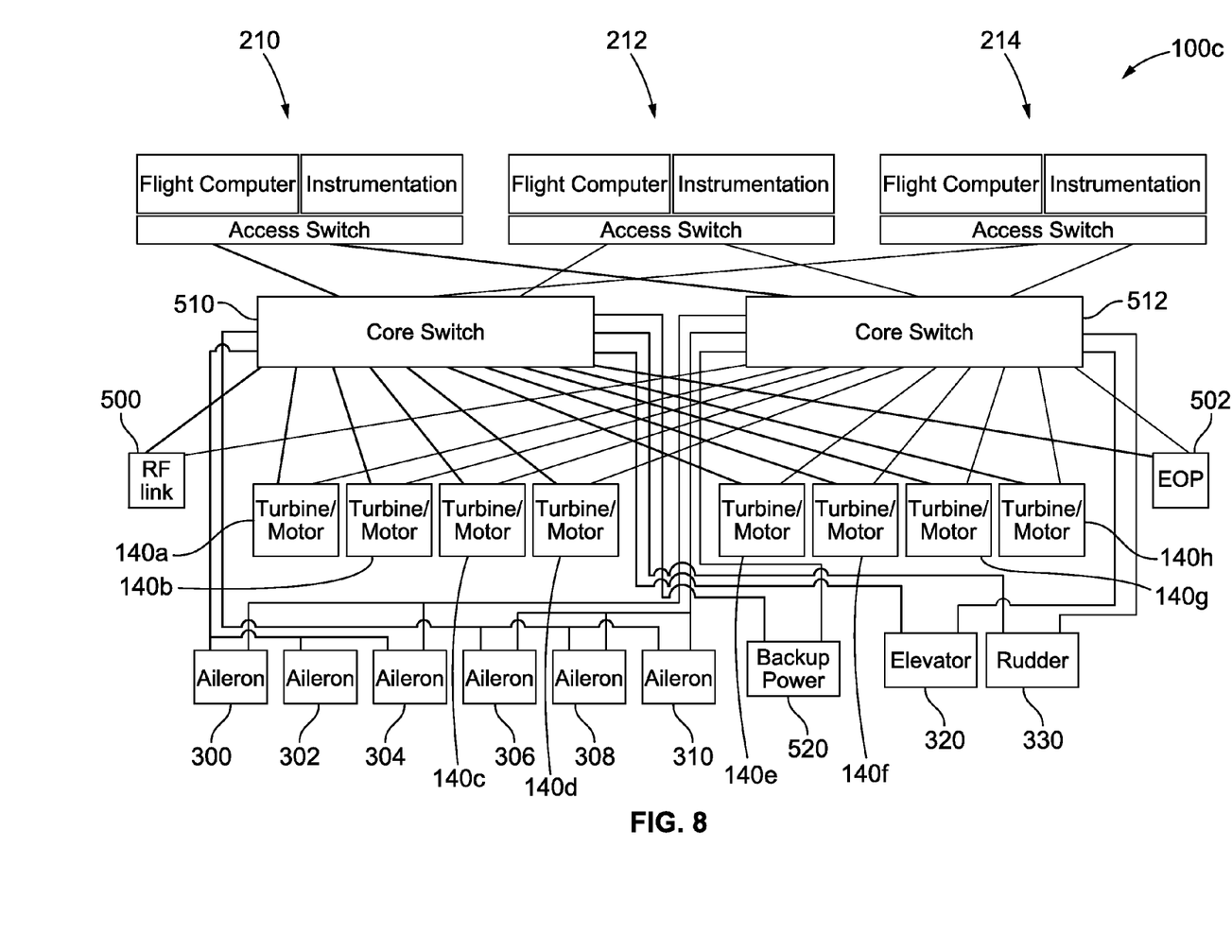
FIG. 8 is a block diagram illustrating the communication links between the components of the network of aerial vehicle 120 shown in FIGS. 3 and 4.

FIG. 8 is a block diagram 100c illustrating the communication links using plastic optical fiber between the components of the network of aerial vehicle 120 shown in FIGS. 3 and 4. This block diagram 100c shows triple-redundant flight computers connected with a dual redundant network. The flight computers, avionics instrumentation and the access switch are packaged in flight control units 210, 212, and 214 respectively. Each of the flight control units 210, 212, and 214 are connected to core switch 510 and core switch 512. Core switch 510 is in turn connected to rotors 140a-140h, and to aileron servo motors 300, 302, 304, 306, 308, and 310, as well as rear elevator servo motor 320 and rudder servo motor 330. In other embodiments, such as shown in FIG. 6, redundant servo motors 322 and 332 for the rear elevator and rudder may also be used. Core switch 510 is also connected to RF link 500, EOP 502, and backup power source 520.

Similarly, core switch 512 is connected to rotors 140a-140h, and to aileron servo motors 300, 302, 304, 306, 308, and 310, as well as rear elevator servo motor 320 and rudder servo motor 330. In other embodiments, such as shown in FIG. 6, redundant servo motors 322 and 332 for the rear elevator and rudder may also be used. Core switch 510 is also connected to RF link 500, EOP 502, and backup power source 520.

The disclosed embodiments provide a reliable network using plastic optical fiber as the signal transmission medium that provides a number of advantages over the use of glass optical fiber in terms of reliability, ease of service and maintenance, and overall cost. The disclosed embodiments also include various redundancies and backup measures that help to insure reliable communications between the components of the network, such that communication links are maintained even if one communication link fails.

4. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An airborne wind turbine system, comprising:
    an aerial vehicle having a main wing,
        an electrically conductive tether having a first end secured to the aerial vehicle and a second end secured to a ground station;
        a plurality of power generating turbines connected to the main wing;
        a communication network positioned with the aerial vehicle, including a first flight control computer;
        first plastic optical fiber signal transmission lines extending between the first flight control computer and the plurality of power generating turbines;
        a second flight control computer, and second plastic optical fiber signal transmission lines extending between the second flight control computer and the plurality of power generating turbines; wherein the first flight control computer and the second flight control computer are linked together with one or more plastic optical fiber signal transmission lines; and
        a rudder attached to the aerial vehicle, wherein the rudder has first and second rudder actuators and wherein a first plastic optical fiber signal transmission rudder line extends between the first flight control computer and the first rudder actuator, and wherein a second plastic optical fiber signal transmission rudder line extends between only the first rudder actuator and the second rudder actuator.

2. The airborne wind turbine system of claim 1, wherein the first plastic optical fiber signal transmission lines extend between the first flight control computer and each of the power generating turbines.

3. The airborne wind turbine system of claim 1, wherein the first plastic optical fiber signal transmission lines extend between the first flight control computer and each of the power generating turbines, and wherein the second plastic optical fiber signal transmission lines extend between the second flight control computer and each of the power generating turbines.

4. The airborne wind turbine system of claim 1, wherein the distance between the first flight control computer and any of the plurality of power generating turbines is less than 6 meters.

5. The airborne wind turbine system of claim 1, further including a third plastic optical fiber signal transmission rudder line extending between the second flight control computer and the second rudder actuator, and a fourth plastic optical fiber signal transmission rudder line extending between the second rudder actuator and the first rudder actuator.

6. The airborne wind turbine system of claim 1, further including a rear elevator, wherein the rear elevator has first and second elevator actuators and wherein a first plastic optical fiber signal transmission elevator line extends between the first flight control computer and the first rear elevator actuator, and wherein a second plastic optical fiber signal transmission elevator line extends between the first rear elevator actuator and the second rear elevator actuator.

7. The airborne wind turbine system of claim 6, further including a third plastic optical fiber signal transmission elevator line extending between the second flight control computer and the second rear elevator actuator, and a fourth plastic optical fiber signal transmission elevator line extending between the second rear elevator actuator and the first rear elevator actuator.

8. The airborne wind turbine system of claim 1, further including a plurality of ailerons attached to the main wing, wherein first plastic optical fiber signal transmission aileron lines extend between the first flight control computer and the plurality of ailerons, and wherein second plastic optical fiber signal transmission aileron lines extend between the first flight control computer and the plurality of ailerons.

9. The airborne wind turbine system of claim 8, further including third plastic optical fiber signal transmission aileron lines extending between the second flight control computer and the plurality of ailerons, and fourth plastic optical fiber signal transmission aileron lines extending between the second flight control computer and the plurality of ailerons.

10. The airborne wind turbine system of claim 9, wherein the distance between the first flight control computer and a furthest aileron is less than 10 meters.

11. An airborne wind turbine system, comprising:
an aerial vehicle having a fuselage and a main wing;
an electrically conductive tether having a first end secured to the aerial wing and a second end secured to a ground station;
a plurality of power generating turbines connected to the main wing;
first and second ailerons positioned on a first side of the main wing;
third and fourth ailerons positioned on a second side of the main wing that is on an opposite side of the fuselage from the first side of the main wing;
a communication network positioned with the aerial vehicle, including a first flight control computer and a second flight control computer;
a first duplex plastic optical fiber signal transmission line extending between the first flight control computer and the first aileron;
a second duplex plastic optical fiber signal transmission line extending between the first aileron and the second aileron;
a third duplex plastic optical fiber signal transmission line extending between the first flight control computer and the second flight control computer;
a fourth duplex plastic optical fiber signal transmission line extending between the second flight control computer and the second aileron;
a fifth duplex plastic optical fiber signal transmission line extending between the first aileron and the second aileron;
a sixth duplex plastic optical fiber signal transmission line extending between the second flight control computer and the third aileron;
a seventh duplex plastic optical fiber signal transmission line extending between the third aileron and the fourth aileron;
an eighth duplex plastic optical fiber signal transmission line extending between the second flight control computer and the fourth aileron; and
a ninth duplex plastic optical fiber signal transmission line extending between the third aileron and the fourth aileron.

12. The airborne wind turbine system of claim 11, further including a rudder positioned on the aerial vehicle wherein the rudder has first and second servo motors, and a tenth duplex plastic optical fiber signal transmission line extending between the first flight computer and the first rudder servo motor and an eleventh duplex plastic optical fiber signal transmission line extending between the first rudder servo motor and the second rudder servo motor.

13. The airborne wind turbine system of claim 12, further including a twelfth duplex plastic optical fiber signal transmission line extending between the second flight computer and the second rudder servo motor and a thirteenth duplex plastic optical fiber signal transmission line extending between the first rudder servo motor and the second rudder servo motor.

14. The airborne wind turbine system of claim 11, wherein the rear elevator includes first and second servo motors, and a tenth duplex plastic optical fiber signal transmission line extending between the first flight computer and the first rear elevator servo motor and an eleventh duplex plastic optical fiber signal transmission line extending between the first rear elevator servo motor and the second rear elevator servo motor.

15. The airborne wind turbine system of claim 14, further including a twelfth duplex plastic optical fiber signal transmission line extending between the second flight computer and the second rear elevator servo motor and a thirteenth duplex plastic optical fiber signal transmission line extending between the first rear elevator servo motor and the second rear elevator servo motor.

16. The airborne wind turbine system of claim 11, further including duplex plastic optical fiber signal transmission lines extending between the first flight control computer and each of the plurality of power generating turbines.

17. The airborne wind turbine system of claim 16, further including a plurality of duplex plastic optical fiber signal transmission lines extending between the second flight control computer and each of the plurality of power generating turbines.

18. The airborne wind turbine system of claim 11, wherein the first flight control computer and the second flight control computer are interconnected to the first, second, third, and fourth aileron servo motors, but neither are directly connected to the same aileron servo motor.

19. The airborne wind turbine system of claim 11, wherein the first flight control computer and the second flight control computer are connected to each other with a tenth duplex plastic optical fiber signal transmission line.

* * * * *